(12) United States Patent
Mukae

(10) Patent No.: US 12,157,583 B2
(45) Date of Patent: Dec. 3, 2024

(54) FLYING OBJECT COPING SYSTEM, DEFENSE INFORMATION INTEGRATION CENTER, COMMUNICATION ROUTE SEARCH DEVICE, AND FLIGHT PATH PREDICTION DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/276,051

(22) PCT Filed: Feb. 16, 2022

(86) PCT No.: PCT/JP2022/006102
§ 371 (c)(1),
(2) Date: Aug. 7, 2023

(87) PCT Pub. No.: WO2022/176890
PCT Pub. Date: Aug. 25, 2022

(65) Prior Publication Data
US 2024/0092506 A1    Mar. 21, 2024

(30) Foreign Application Priority Data
Feb. 19, 2021   (JP) .................................. 2021-024769

(51) Int. Cl.
*B64G 1/10*  (2006.01)
*F41H 11/02*  (2006.01)

(52) U.S. Cl.
CPC ......... *B64G 1/1028* (2023.08); *B64G 1/1007* (2013.01); *B64G 1/1085* (2013.01); *F41H 11/02* (2013.01)

(58) Field of Classification Search
CPC .. B64G 1/1028; B64G 1/1007; B64G 1/1085; B64G 1/10; B64G 3/00; F41H 11/02
See application file for complete search history.

(56) References Cited

U.S. PATENT DOCUMENTS

| 5,813,634 A | 9/1998 | Pizzicaroli et al. |
| 7,875,837 B1 | 1/2011 | Szabo et al. |

(Continued)

FOREIGN PATENT DOCUMENTS

| CN | 116685922 A | * 9/2023 | ........... B64G 1/1085 |
| JP | 2000-193741 A | 7/2000 | |

(Continued)

OTHER PUBLICATIONS

International Search Report mailed on Apr. 26, 2022, received for PCT Application PCT/JP2022/006101, filed on Feb. 16, 2022, 7 pages including English Translation.

(Continued)

*Primary Examiner* — Valentina Xavier
(74) *Attorney, Agent, or Firm* — XSENSUS LLP

(57) ABSTRACT

A surveillance satellite (100) of a surveillance system (310) transmits flying object information, which is generated by monitoring a flying object (520), to a coping system (330) via a communication satellite (200) of a communication system. A defense information integration center (350) includes a communication route search device (470) for satellite information, a flight path prediction device (5490) predicting a flight path of a flying object, and a coping asset selection device (333). The defense information integration center (350) transmits an instruction command to a surveillance satellite group included in the surveillance system (310), a communication satellite group included in the communication system (320), and a coping asset (332).

23 Claims, 17 Drawing Sheets

(56) References Cited

U.S. PATENT DOCUMENTS

2010/0038490 A1    2/2010   Hofschuster et al.
2018/0106898 A1    4/2018   Baskaran et al.

FOREIGN PATENT DOCUMENTS

JP      2008-137439 A    6/2008
KR    20230048906 A  *  4/2023  ............ F41H 11/02
WO     2020261481 A1   12/2020

OTHER PUBLICATIONS

International Search Report mailed on Apr. 26, 2022, received for PCT Application PCT/JP2022/006102, filed on Feb. 16, 2022, 7 pages including English Translation.
International Search Report mailed on Apr. 26, 2022, received for PCT Application PCT/JP2022/006103, filed on Feb. 16, 2022, 7 pages including English Translation.
International Search Report mailed on Apr. 5, 2022, received for PCT Application PCT/JP2022/006104, filed on Feb. 16, 2022, 5 pages including English Translation.
International Search Report mailed on Apr. 5, 2022, received for PCT Application PCT/JP2022/006107, filed on Feb. 16, 2022, 5 pages including English Translation.
Notice of Reasons for Refusal mailed Dec. 26, 2023, in Japanese Application No. 2023-500882, 9 pages.
Notice of Reasons for Refusal mailed Dec. 26, 2023, in Japanese Application No. 2023-500884, 9 pages.

* cited by examiner

Fig. 15

| SATELLITE ID | ID-1 | ID-2 | ID-3 | ... |
|---|---|---|---|---|
| FORECAST TIME | 12:05 | 12:10 | 12:15 | ... |

LIST

1. POSITIONAL COORDINATE OF SURVEILLANCE SATELLITE AT LAUNCH DETECTION TIME
2. POSITIONAL COORDINATE AT WHICH LAUNCH OF FLYING OBJECT IS DETECTED
3. VISUAL FIELD CHANGING RANGE OF SURVEILLANCE SATELLITE
4. POSITIONAL COORDINATE OF SURVEILLANCE SATELLITE THAT SENDS HIGH-TEMPERATURE DETECTION SIGNAL
5. POSITIONAL COORDINATE AT WHICH HIGH-TEMPERATURE OBJECT IS DETECTED
6. VISUAL FIELD CHANGE

SEARCH FOR ID OF NEAR-PASSAGING SURVEILLANCE SATELLITE THAT CAN MONITOR VICINITY OF HIGH-TEMPERATURE OBJECT DETECTION POSITION BY INCLUDING VISUAL FIELD CHANGE

470 COMMUNICATION ROUTE SEARCH DEVICE

| SATELLITE ID | ID-1 | ID-2 | ID-3 | ... |
|---|---|---|---|---|
| COMMAND | CMD-1 | CMD-2 | CMD-3 | ... |

COMMAND

FLYING OBJECT COPING SYSTEM, DEFENSE INFORMATION INTEGRATION CENTER, COMMUNICATION ROUTE SEARCH DEVICE, AND FLIGHT PATH PREDICTION DEVICE

CROSS-REFERENCE TO RELATED APPLICATIONS

The present application is based on PCT filing PCT/JP2022/006102, filed Feb. 16, 2022, which claims priority from Japanese Patent Application No. 2021-024769, filed Feb. 19, 2021. This application is also related to U.S. patent application Ser. No. 18/276,041, entitled FLYING OBJECT COPING SYSTEM, SATELLITE UNIFIED ORDERING CENTER, COMMUNICATION ROUTE SEARCH DEVICE, FLIGHT PATH PREDICTION DEVICE, ABOVE-EQUATOR SATELLITE SYSTEM, ABOVE-EQUATOR SATELLITE, INCLINED ORBIT SATELLITE SYSTEM, INCLINED ORBIT SATELLITE, UNIFIED DATA LIBRARY, AND SATELLITE CONSTELLATION, filed Aug. 7, 2023; U.S. patent application Ser. No. 18/276,046, entitled FLYING OBJECT COPING SYSTEM, MONITORING GROUND CENTER, COMMUNICATION ROUTE SEARCH DEVICE, FLIGHT PATH PREDICTION DEVICE, POLAR ORBIT SATELLITE SYSTEM, POLAR ORBIT SATELLITE, INCLINED ORBIT SATELLITE SYSTEM, AND INCLINED ORBIT SATELLITE, filed Aug. 7, 2023; U.S. patent application Ser. No. 18/276,043, entitled FLYING OBJECT COPING SYSTEM, SURVEILLANCE GROUND CENTER, COPING GROUND CENTER, COMMUNICATION ROUTE SEARCH DEVICE, FLIGHT PATH PREDICTION DEVICE, AND COPING ASSET SELECTION DEVICE, filed Aug. 7, 2023; U.S. patent application Ser. No. 18/276,040, entitled COMMUNICATION ROUTE SEARCH METHOD, GROUND SYSTEM, SURVEILLANCE SATELLITE CONSTELLATION, COMMUNICATION SATELLITE CONSTELLATION, FLYING OBJECT COPING SYSTEM, UNIFIED DATA LIBRARY, SATELLITE, AND SATELLITE CONSTELLATION, filed Aug. 7, 2023. The entire contents of each are incorporated herein by reference.

TECHNICAL FIELD

The present disclosure relates to a flying object coping system, a defense information integration center, a communication route search device, a flight path prediction device, a coping asset selection device, an equatorial satellite system, a polar orbit satellite system, and a surveillance satellite.

BACKGROUND ART

In recent years, with the emergence of flying objects that glide at supersonic speed, surveillance with satellites such as detection of flying object launches, flight path tracking, and prediction of landing position has been expected. A promising means of detecting and tracking a flying object in a gliding phase is infrared detection of temperature rise which is caused by atmospheric friction generated when the flying object enters the atmosphere. Further, promising means of infrared detection of flying objects in a gliding phase is considered to be surveillance from a low earth orbit satellite group.

Patent Literature 1 discloses a surveillance satellite to comprehensively monitor a specific latitude region within the global sphere of the earth with a small number of satellites orbiting in low earth orbit.

CITATION LIST

Patent Literature

Patent Literature 1: JP 2008-137439

SUMMARY OF INVENTION

Technical Problem

In surveillance from low earth orbit, a distance from an artificial satellite to a flying object is shorter than that in surveillance from geostationary orbit. This makes it possible to improve detection performance by infrared rays. A huge number of satellites are required to maintain constant surveillance and communication lines with LEO satellites, and further, unlike geostationary satellites, which appear to be almost stationary with respect to the earth fixed coordinate system, LEO satellites move their flight positions from time to time. These bring issues of a configuration and a data transmission method of a surveillance device equipped with an infrared surveillance device and a communication satellite group.

An object of the present disclosure is to provide a flying object coping system with which launch of a flying object is detected by using a surveillance system, which includes a surveillance satellite group equipped with surveillance devices, and a satellite information transmission system, in which a communication network is formed with a communication satellite group, so as to be able to transmit the flying object information to a coping system in quasi-real time and quickly and accurately cope with the flying object.

Solution to Problem

A flying object coping system includes:
a surveillance system including a plurality of surveillance satellites, the plurality of surveillance satellites including a surveillance device and a communication device;
a communication system including a plurality of communication satellites, the plurality of communication satellites including communication device; and
a coping system positioned on at least one of land, sea, and air and including a coping asset, the coping asset coping with a flying object, wherein
the surveillance system transmits flying object information, the flying object information being generated by monitoring the flying object, to the coping system via the communication system,
the flying object coping system includes a defense information integration center including a communication route search device for satellite information, a flight path prediction device to predict a flight path of a flying object, and a coping asset selection device, and
the defense information integration center transmits an instruction command to a surveillance satellite group included in the surveillance system, a communication satellite group included in the communication system, and the coping asset.

Advantageous Effects of Invention

According to the flying object coping system of the present disclosure, flying object information can be transmitted to a coping system in quasi-real time. Further, the flying object coping system according to the present disclosure can quickly and accurately cope with a flying object.

BRIEF DESCRIPTION OF DRAWINGS

FIG. 15 is a diagram of Embodiment 1, illustrating the communication route search device 470 included in the defense information integration center 350.

DESCRIPTION OF EMBODIMENTS

Figure 1:
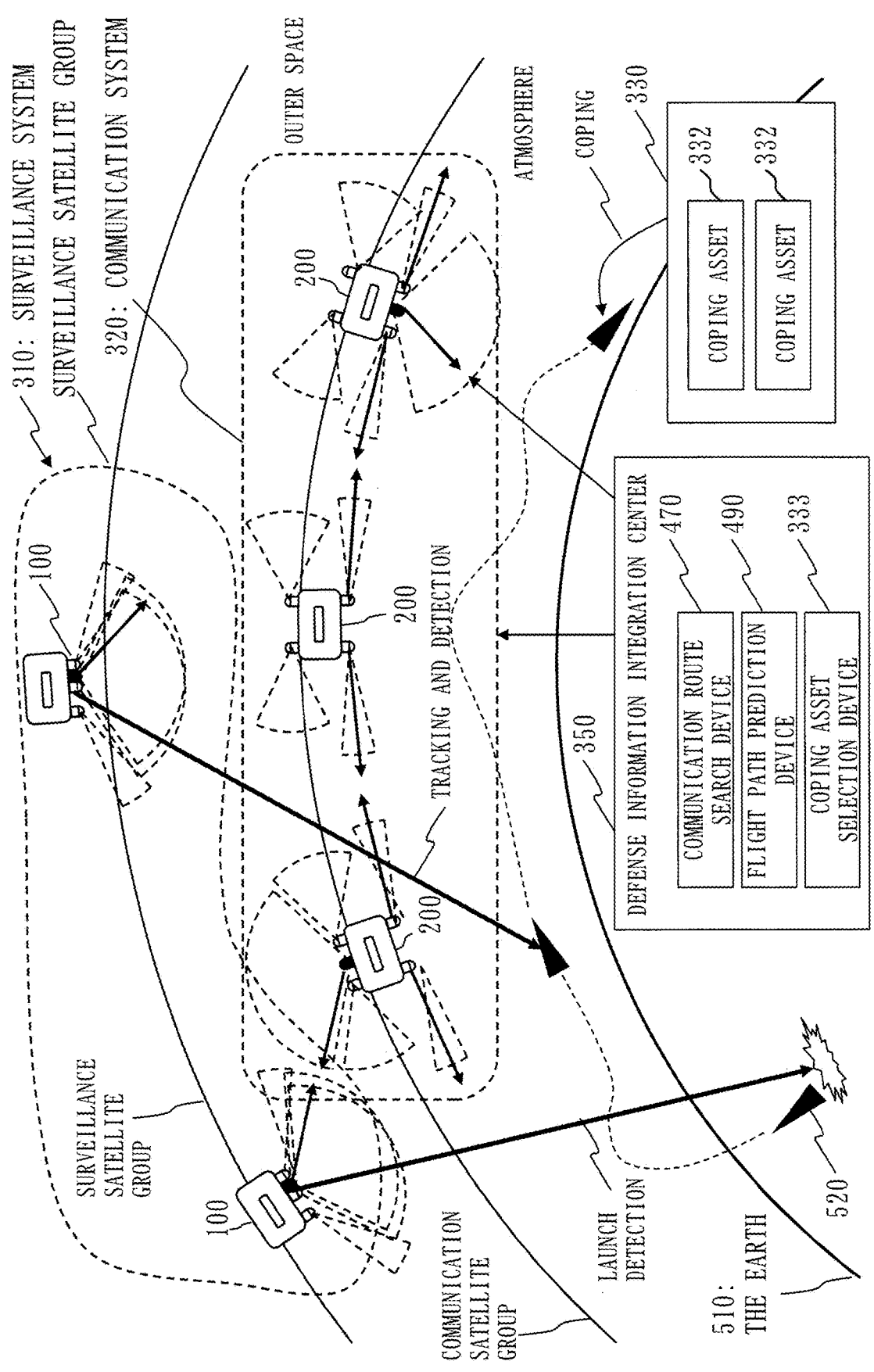
FIG. 1 is a diagram of Embodiment 1, illustrating a system configuration of a flying object coping system 1000.

In description of embodiments and drawings, the same and corresponding components are given the same reference characters. Description of a component having the same reference character will be omitted or simplified as appropriate. In the following embodiments, a "unit" may be read as "circuit", "step", "procedure", "processing", or "circuitry" as appropriate.

Embodiment 1

FIG. 1 illustrates a configuration example of a flying object coping system 1000. The flying object coping system 1000 includes a surveillance system 310, a communication system 320, and a coping system 330. The surveillance system 310 includes a plurality of surveillance satellites 100 that are equipped with a surveillance device and a communication device. The communication system 320 includes a plurality of communication satellites 200 that are equipped with a communication device. The coping system 330 is positioned on at least one of land, sea, and air and provided with one or more coping assets 332 that cope with flying objects. In FIG. 1, the coping system 330 is provided with two coping assets 332.

In the flying object coping system 1000, the surveillance satellite 100 of the surveillance system 310 transmits flying object information, which is generated by monitoring a flying object 520, to the communication satellite 200 of the communication system 320 and the communication system 320 transmits the flying object information to the coping system 330.

As illustrated in FIG. 1, the flying object coping system 1000 includes a defense information integration center 350 that includes a communication route search device 470 for satellite information, a flight path prediction device 490 predicting a flight path of a flying object, and a coping asset selection device 333. The defense information integration center 350 transmits an instruction command to the surveillance satellite group included in the surveillance system 310, the communication satellite group included in the communication system 320, and the coping asset 332.

Examples of the satellite 620 and a ground facility 700 in a satellite constellation forming system 600 which forms a satellite constellation 610 will be described with reference to FIGS. 2 to 4. The satellite constellation forming system 600 is sometimes called merely the satellite constellation.

Figure 2:
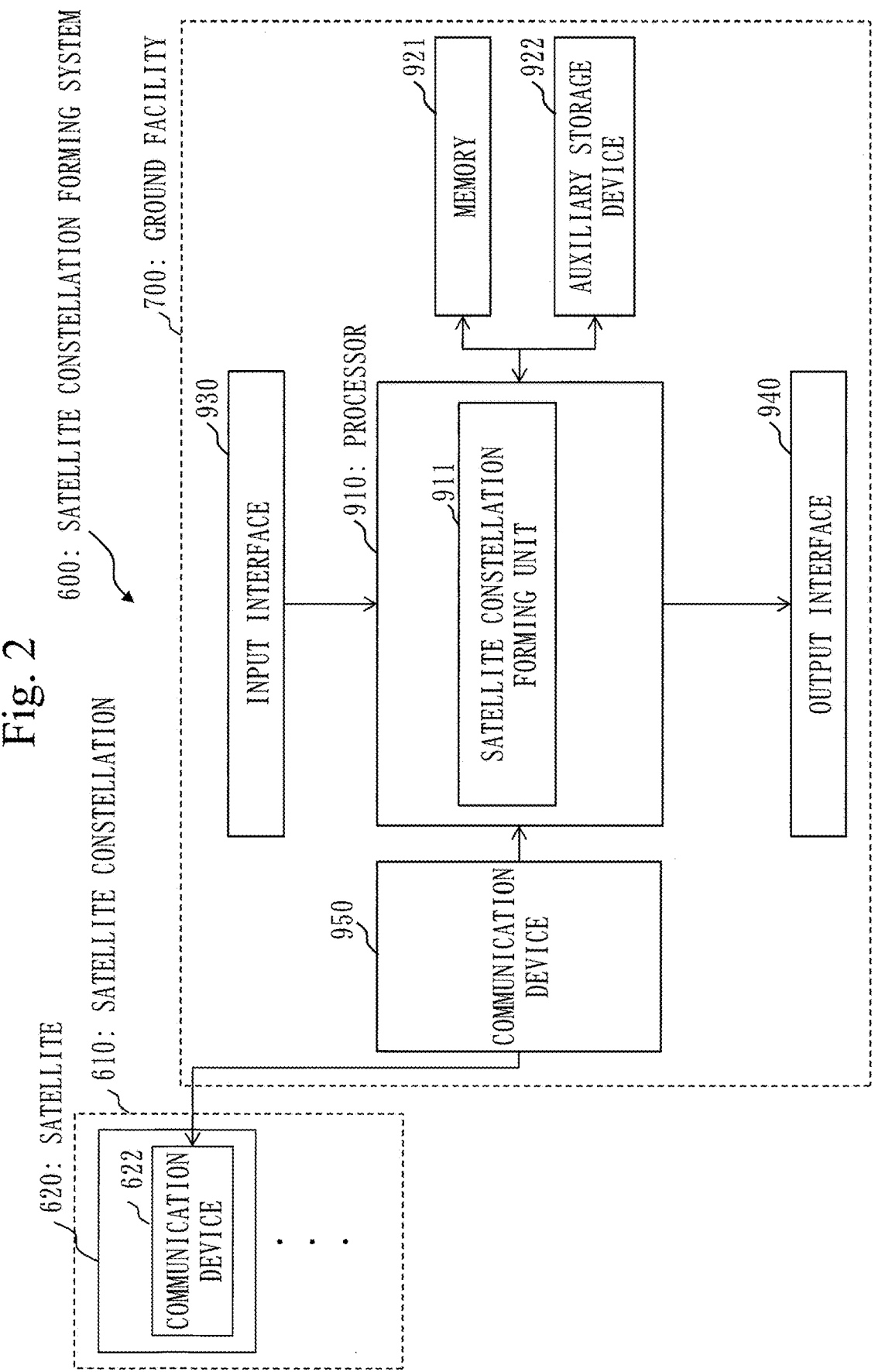
FIG. 2 is a diagram of Embodiment 1, illustrating a configuration of a satellite constellation forming system 600.

FIG. 2 illustrates an example of the configuration of the satellite constellation forming system 600. The satellite constellation forming system 600 includes a computer. Although FIG. 2 shows a configuration of a single computer, computers are provided to respective satellites 620 of a plurality of satellites constituting the satellite constellation 610 and respective ground facilities 700 that communicate with the satellites 620 in practice. The computers provided to respective satellites 620 of a plurality of satellites and respective ground facilities 700 communicating with the satellites 620 work together to realize a function of the satellite constellation forming system 600. An example of the configuration of the computer realizing the function of the satellite constellation forming system 600 will be described below.

The satellite constellation forming system 600 includes the satellite 620 and the ground facility 700. The satellite 620 includes a communication device 622 that communicates with a communication device 950 of the ground facility 700. FIG. 2 illustrates the communication device 622 among components included in the satellite 620.

The satellite constellation forming system 600 includes a processor 910 and other hardware such as a memory 921, an auxiliary storage device 922, an input interface 930, an output interface 940, and the communication device 950. The processor 910 is connected with other pieces of hardware via a signal line and controls these pieces of other hardware.

The satellite constellation forming system 600 includes a satellite constellation forming unit 911 as a functional element. A function of the satellite constellation forming unit 911 is realized by software or hardware. The satellite constellation forming unit 911 controls formation of the satellite constellation 610 while communicating with the satellite 620.

Figure 3:
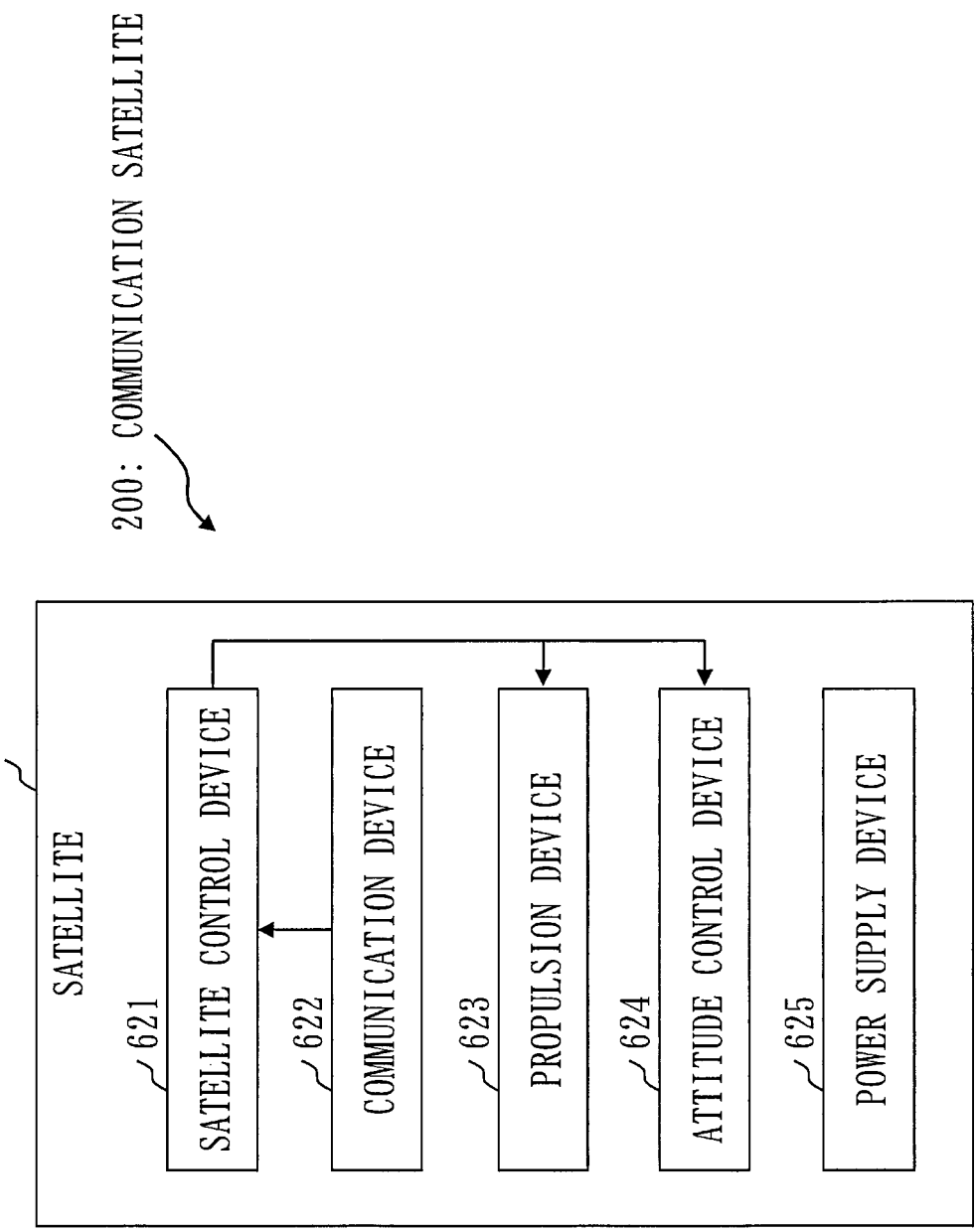
FIG. 3 is a diagram of Embodiment 1, illustrating an example of a configuration of a satellite 620 in the satellite constellation forming system 600.

FIG. 3 illustrates an example of a configuration of the satellite 620 in the satellite constellation forming system 600. The satellite 620 includes a satellite control device 621, the communication device 622, a propulsion device 623, an attitude control device 624, and a power supply device 625. Other components for realizing various functions may also be included, but the satellite control device 621, the communication device 622, the propulsion device 623, the attitude control device 624, and the power supply device 625 will be described in FIG. 3. The satellite 620 in FIG. 3 is an example of the communication satellite 200 equipped with the communication device 622.

The satellite control device 621 is a computer that controls the propulsion device 623 and the attitude control device 624, and includes a processing circuit. Specifically, the satellite control device 621 controls the propulsion device 623 and the attitude control device 624 in accordance with various commands transmitted from the ground facility 700.

The communication device 622 is a device that communicates with the ground facility 700. Alternatively, the communication device 622 is a device that communicates with front and rear satellites 620 in the same orbital plane or communicates with satellites 620 in adjacent orbital planes. Specifically, the communication device 622 transmits various types of data related to own satellite to the ground facility 700 or other satellites 620. Further, the communication device 622 receives various commands transmitted from the ground facility 700. The propulsion device 623 is a device to provide propulsion to the satellite 620 and changes the speed of the satellite 620. The attitude control device 624 is a device to control attitude elements such as the attitude of the satellite 620 and the angular velocity and a line of sight of the satellite 620. The attitude control device 624 changes each attitude element to a desired direction. Alternatively, the attitude control device 624 keeps each attitude element in a desired direction. The attitude control device 624 includes an attitude sensor, an actuator, and a controller. The attitude sensor is a device such as a gyroscope, an earth sensor, a sun sensor, a star tracker, a thruster, and a magnetic sensor. The actuator is a device such as an attitude control thruster, a momentum wheel, a reaction wheel, and a control moment gyro. The controller controls the actuator in accordance with measurement data of the attitude sensor or various commands from the ground facility 700. The power supply device 625 includes equipment such as a solar cell, a battery, and a power control device, and supplies power to each equipment mounted on the satellite 620.

The processing circuit included in the satellite control device 621 will be described. The processing circuit may be dedicated hardware or a processor that executes a program stored in a memory. In the processing circuit, part of the function may be realized by dedicated hardware and the rest of the function may be realized by software or firmware. That is, the processing circuit can be realized by hardware, software, firmware, or a combination of these. The dedicated hardware is specifically a single circuit, a composite circuit, a programmed processor, a parallel programmed processor, an ASIC, an FPGA, or a combination of these. ASIC is an abbreviated name of Application Specific Integrated Circuit. FPGA is an abbreviated name of Field Programmable Gate Array.

Figure 4:
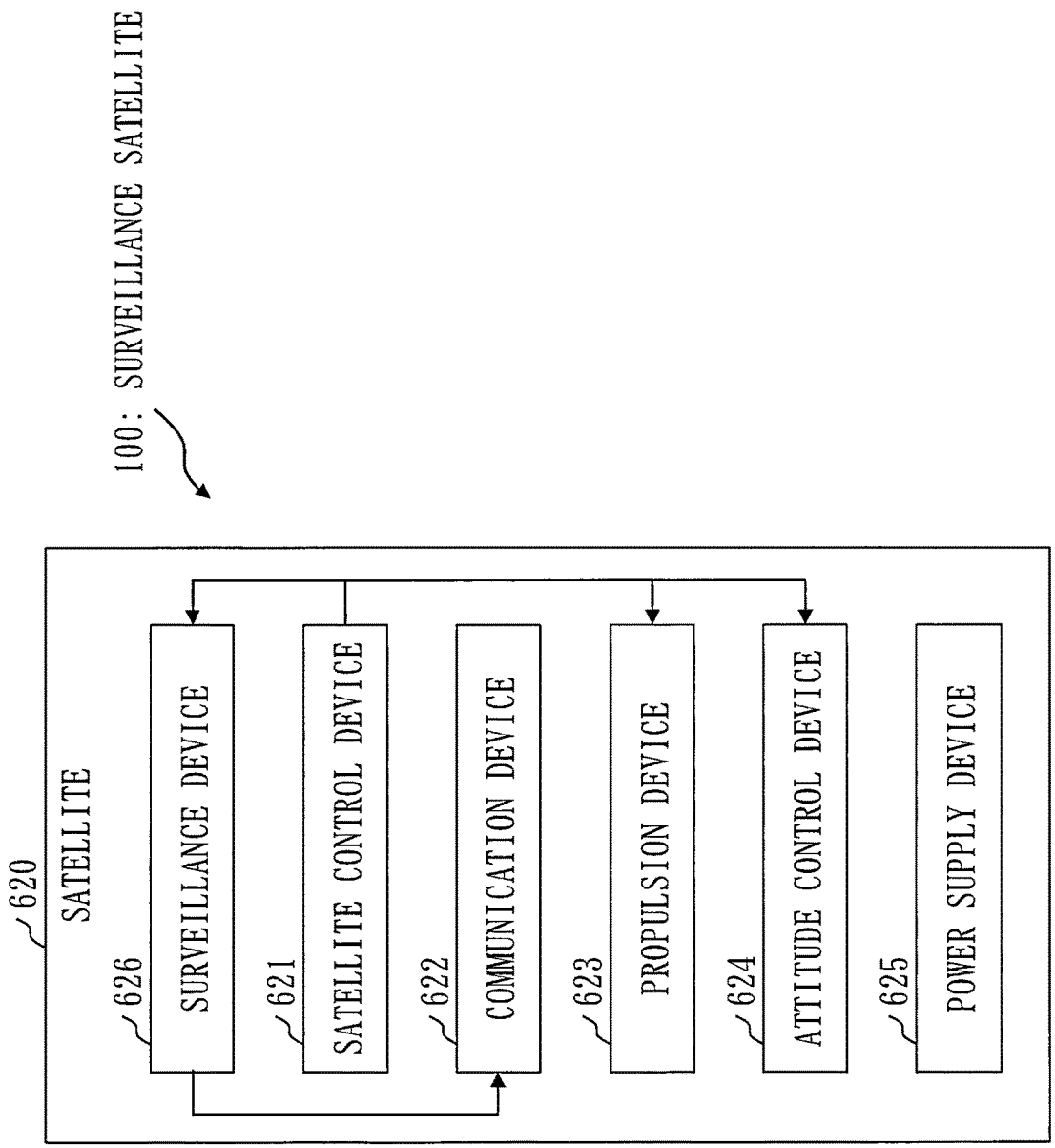
FIG. 4 is a diagram of Embodiment 1, illustrating another configuration of the satellite 620 in the satellite constellation forming system 600.

FIG. 4 illustrates another example of the configuration of the satellite 620 in the satellite constellation forming system 600. The satellite 620 of FIG. 4 includes a surveillance device 626 in addition to the components of FIG. 3. The surveillance device 626 is a device that monitors an object. Specifically, the surveillance device 626 is a device for monitoring or observing objects such as space objects, flying objects, and moving objects on land, sea, and air. The surveillance device 626 is also called an observation device. For example, the surveillance device 626 is an infrared surveillance device that detects temperature rise caused by atmospheric friction generated when a flying object enters the atmosphere with infrared rays. The surveillance device 626 detects a temperature of a plume or body of a flying object in launch of the flying object. Alternatively, the surveillance device 626 may be a light wave or radio wave information collection device. The surveillance device 626 may be a device that detects an object with an optical system. The surveillance device 626 takes an image of an object flying at an altitude, which is different from an orbital altitude of an observation satellite, with an optical system. Specifically, the surveillance device 626 may be a visible optical sensor. The satellite 620 in FIG. 4 is an example of the surveillance satellite 100 equipped with the surveillance device 626 and the communication device 622. The surveillance satellite 100 may include a plurality of surveillance devices 626. Further, the surveillance satellite 100 may include a plurality of types of surveillance devices.

<Satellite Constellation Forming Method>

The satellite constellation 610 formed by the satellite constellation forming system 600 will be described. The satellite constellation 610 is formed by controlling the satellites 620 by the ground facilities 700.

Figure 5:
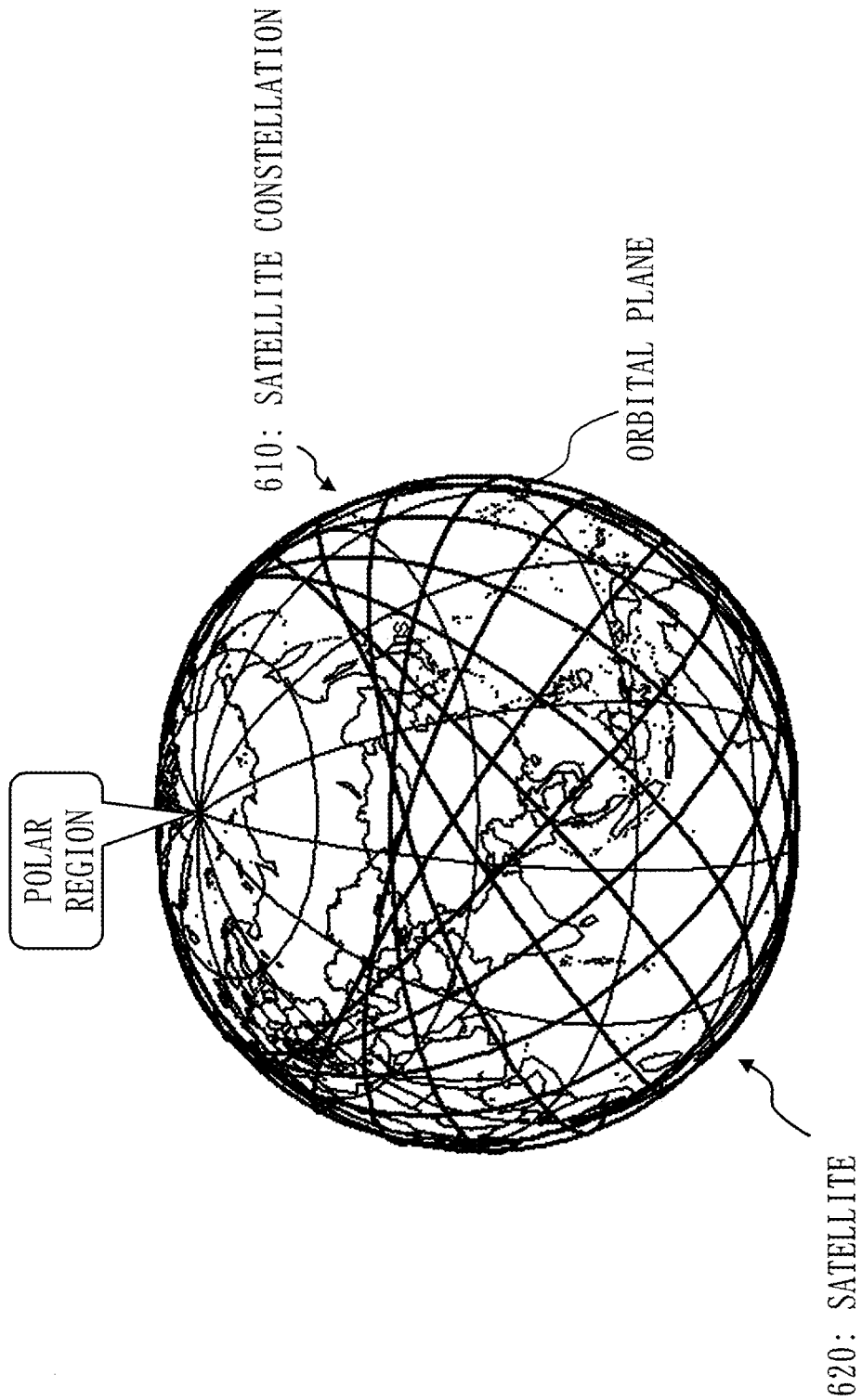
FIG. 5 is a diagram of Embodiment 1, illustrating an example of a satellite constellation 610 having a plurality of orbital planes intersecting with each other at non-polar regions.

FIG. 5 is a diagram illustrating an example of the satellite constellation 610, which has a plurality of orbital planes intersecting with each other at non-polar regions, as one example of the satellite constellation 610. The surveillance system 310 and the communication system 320 are formed as the satellite constellation 610. In the satellite constellation 610 of FIG. 5, orbits are inclined orbits.

The surveillance system 310 includes one or more surveillance satellites 100 that is/are equipped with an infrared surveillance device. The surveillance satellite 100 makes its infrared surveillance device detect a plume in launch of the flying object 520, illustrated in FIG. 1, and the flying object 520 flying at elevated temperature, as high-temperature objects. The surveillance satellite 100 transmits information including detection time, at which the infrared surveillance device detects a high-temperature object, and at least either one positional information of positional information, which indicates a position of the surveillance satellite 100 including the infrared surveillance device, and positional information, which indicates a position of the flying object, as flying object information.

The plurality of communication satellites 200 included in the communication system 320 make a cross-link by the communication devices mounted thereon so as to form a communication network.

Figure 6:
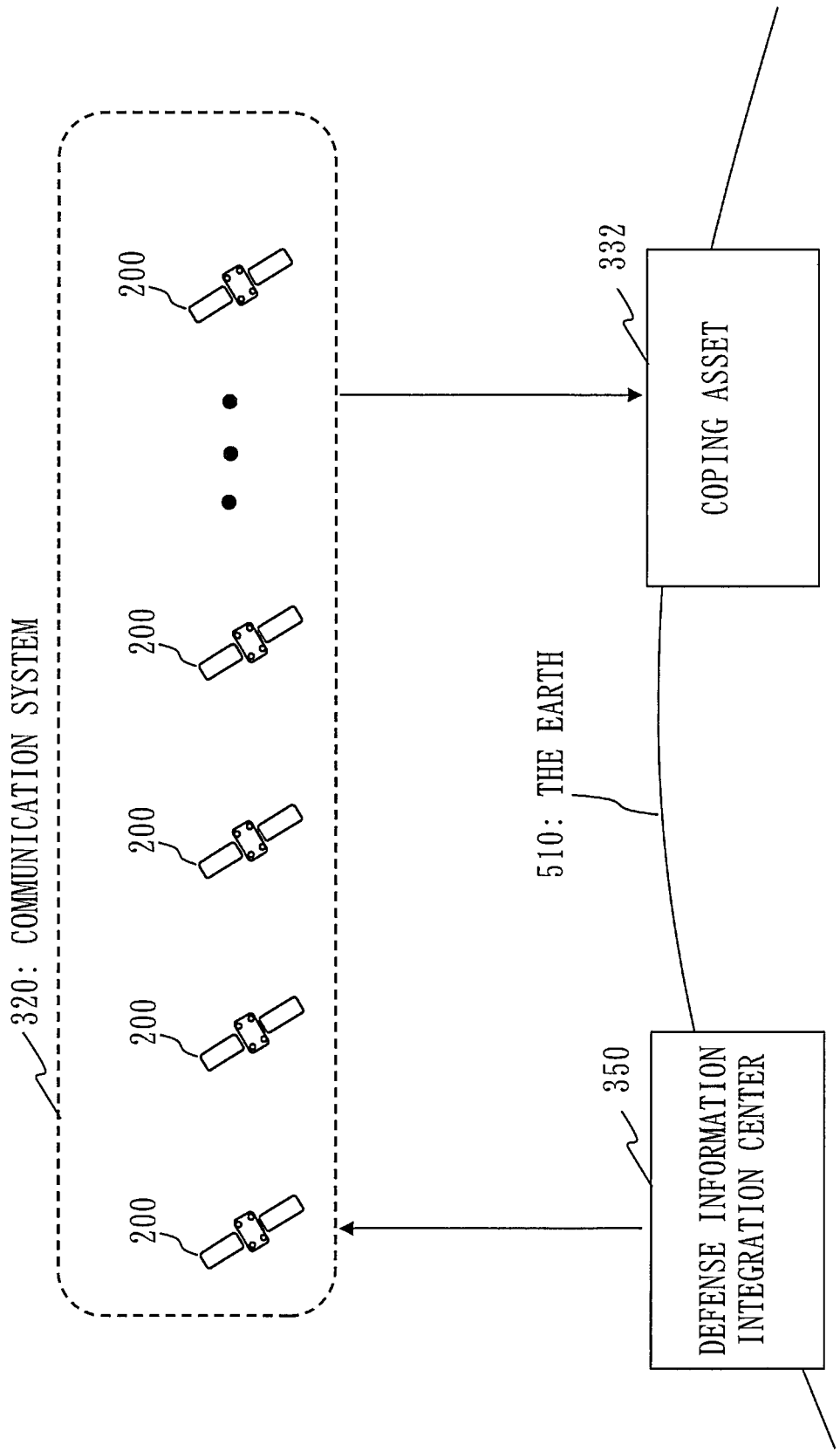
FIG. 6 is a diagram of Embodiment 1, illustrating information transmission from a defense information integration center 350 to a coping system 330.

FIG. 6 is a diagram illustrating information transmission from the defense information integration center 350 to the coping system 330. As illustrated in FIG. 6, the defense information integration center 350 searches for the shortest route of a communication path for information transmission with the communication route search device 470 and transmits an information transmission instruction to the communication satellites 200 constituting the searched communication path.

Figure 7:
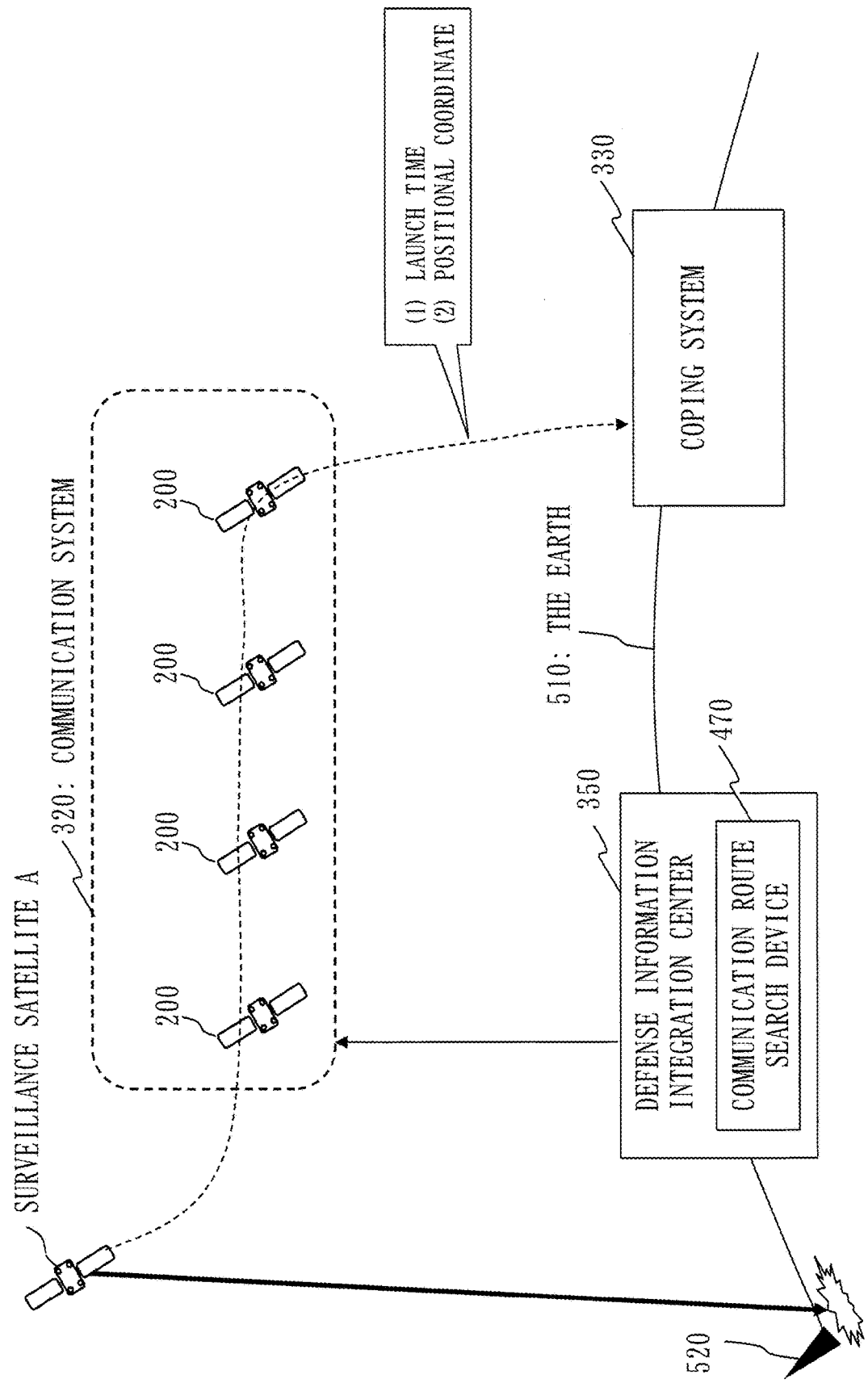
FIG. 7 is a diagram of Embodiment 1, illustrating transmission of flying object information measured by a surveillance satellite A to the coping system 330.

FIG. 7 is a diagram illustrating transmission of flying object information measured by a surveillance satellite A to the coping system 330 via the communication satellite 200. FIG. 7 is referred to. After the surveillance satellite A included in the surveillance system 310 detects launch of the flying object 520, the defense information integration center 350 acquires launch detection information transmitted by the surveillance satellite A via the communication satellite 200.

The defense information integration center 350 transmits information, which includes the launch detection time of the flying object 520 and positional information indicating a position of at least either one of the flying object and the surveillance satellite A, as flying object information to the coping system 330 via the communication satellite 200 of the communication system 320. In this configuration, the defense information integration center 350 can transmit flying object information to the coping system 330 via the communication system 320.

FIG. 7 is referred to. The defense information integration center 350 searches for the shortest route in a communication network, which is formed by a communication satellite group from a positional coordinate from which the surveillance satellite A emits flying object information to a positional coordinate of the coping system 330, with the use of the communication route search device 470 so as to transmit an information transmission instruction to the communication satellite group positioned on a communication path of the shortest route.

Further, the defense information integration center 350 transmits information, which includes launch detection time of a flying object and at least either one positional information of positional information indicating a position of the surveillance satellite A and positional information indicating a position of the launch point of the flying object, as flying object information to the coping system 330.

Figure 8:
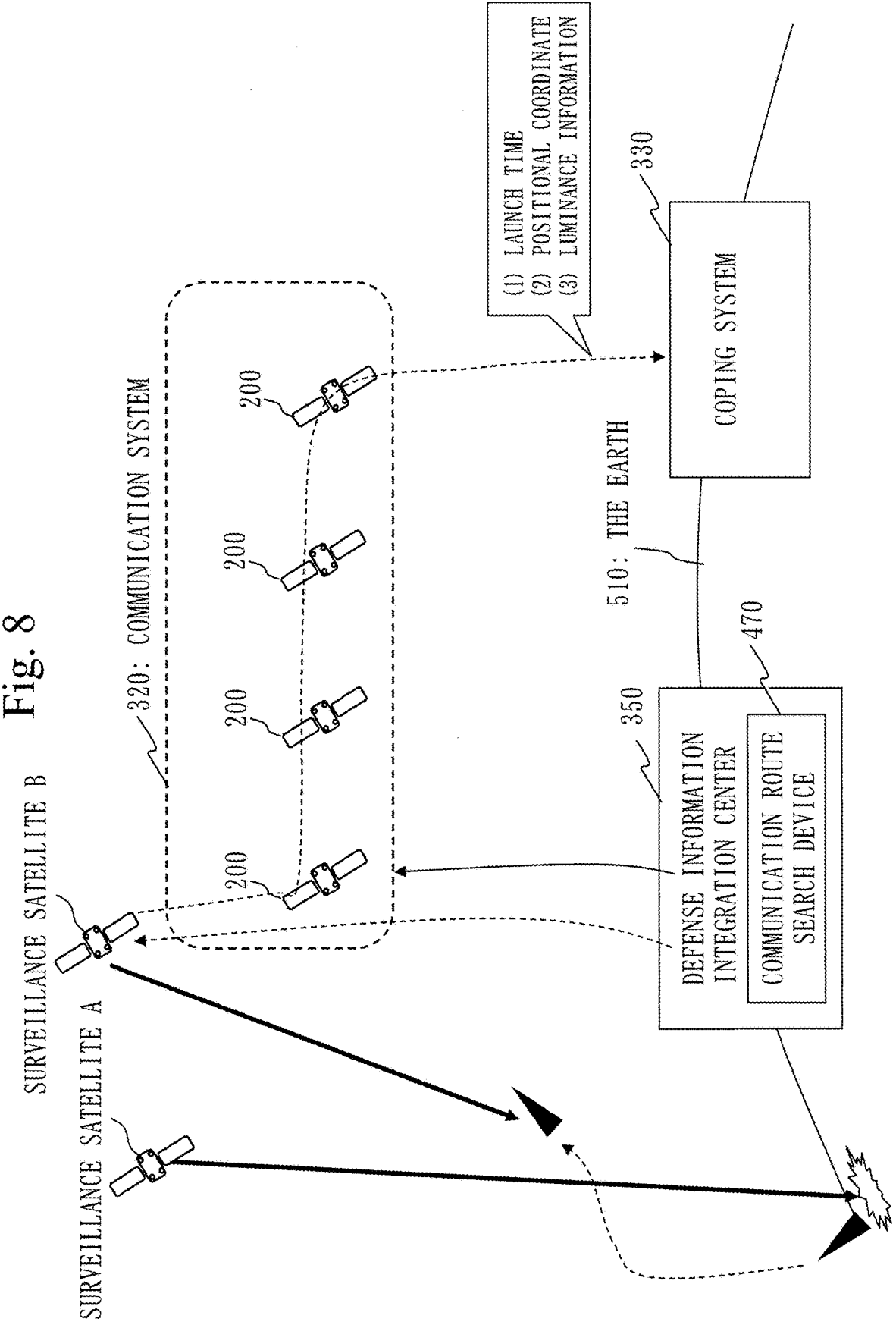
FIG. 8 is a diagram of Embodiment 1, illustrating transmission of flying object information measured by a surveillance satellite B to the coping system 330.

FIG. 8 is a diagram illustrating transmission of flying object information measured by a surveillance satellite B to the coping system 330 via the communication satellite 200. FIG. 8 is referred to.

The defense information integration center 350 transmits defense-center-side flying object information via the communication system 320 to a surveillance satellite group flying around the surveillance satellite A after the launch of the flying object. The defense information integration center 350 searches for the shortest route in a communication network, which is formed by a communication satellite group from a positional coordinate indicated by positional information of the surveillance satellite B to a positional coordinate of the coping system 330, with the communication route search device 470 so as to transmit an information transmission instruction to the communication satellite group positioned on a communication path of the shortest route.

The defense information integration center 350 transmits:
(1) detection time of a high-temperature object,
(2) positional coordinate indicating a position of the surveillance satellite B at the detection time, and
(3) luminance information based on the detection by the surveillance satellite B, as flying object information to the coping system 330 via the communication satellite 200 of the communication system 320.

Figure 9:
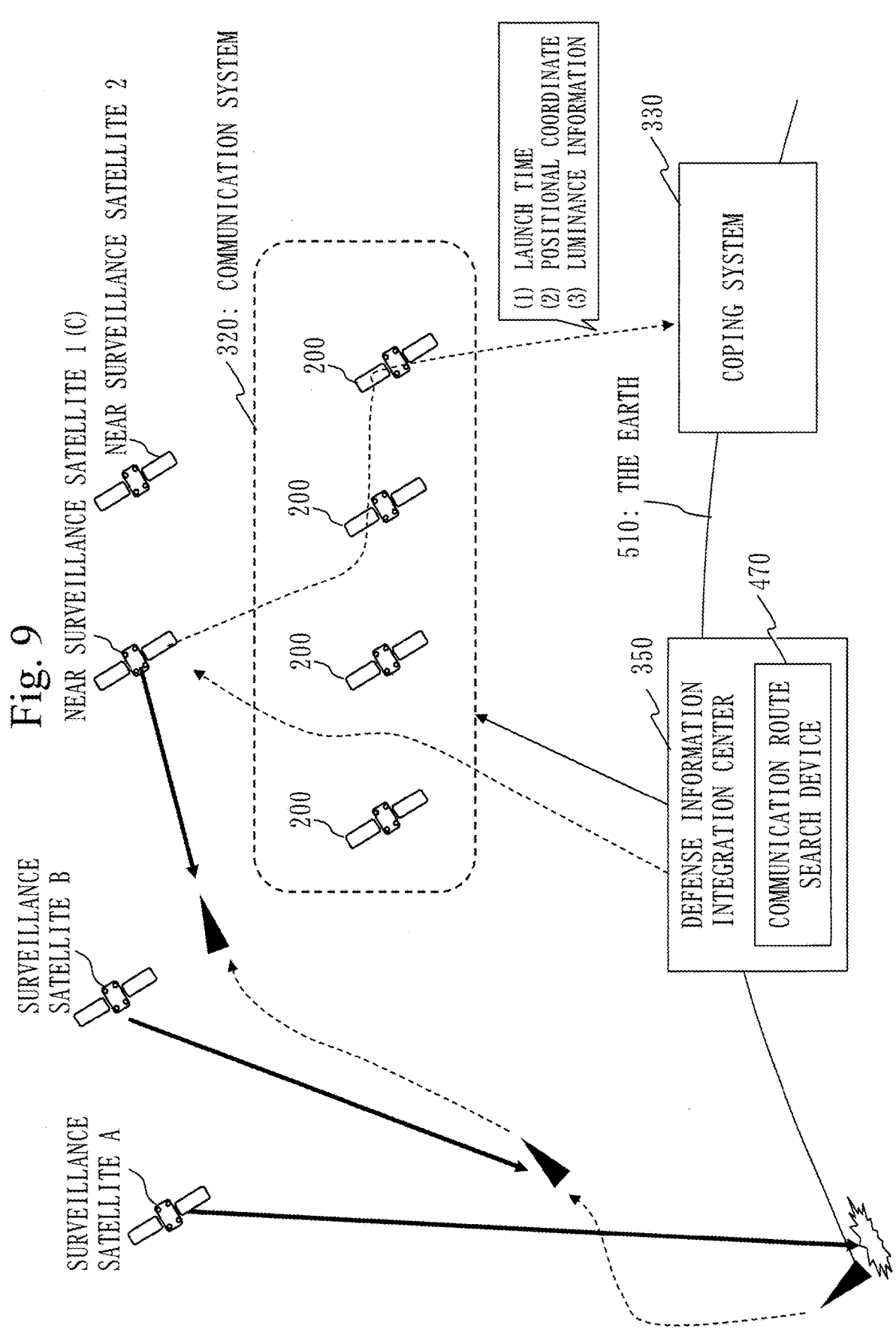
FIG. 9 is a diagram of Embodiment 1, illustrating transmission of flying object information measured by a surveillance satellite C to the coping system 330.

FIG. 9 is a diagram illustrating transmission of flying object information measured by a surveillance satellite C to the coping system 330 via the communication satellite 200. FIG. 9 is referred to. The defense information integration center 350 transmits defense-center-side flying object information via the communication satellite of the communication system 320 to a surveillance satellite group flying in the vicinity of the surveillance satellite B. When the surveillance satellite C detects a high-temperature object, the defense information integration center 350 searches for the shortest route in a communication network from a positional coordinate of the surveillance satellite C to a positional coordinate of the coping system 330, with the communication route search device 470 so as to transmit an information transmission instruction to the communication satellite group positioned on a communication path of the shortest route. Then, the defense information integration center 350 transmits detection time of the high-temperature object detected by the surveillance satellite, a positional coordinate indicating a position of the surveillance satellite C at the detection time, and luminance information based on the detection by the surveillance satellite C, as flying object information to the coping system 330 via the communication satellite 200 of the communication system 320.

Figure 10:
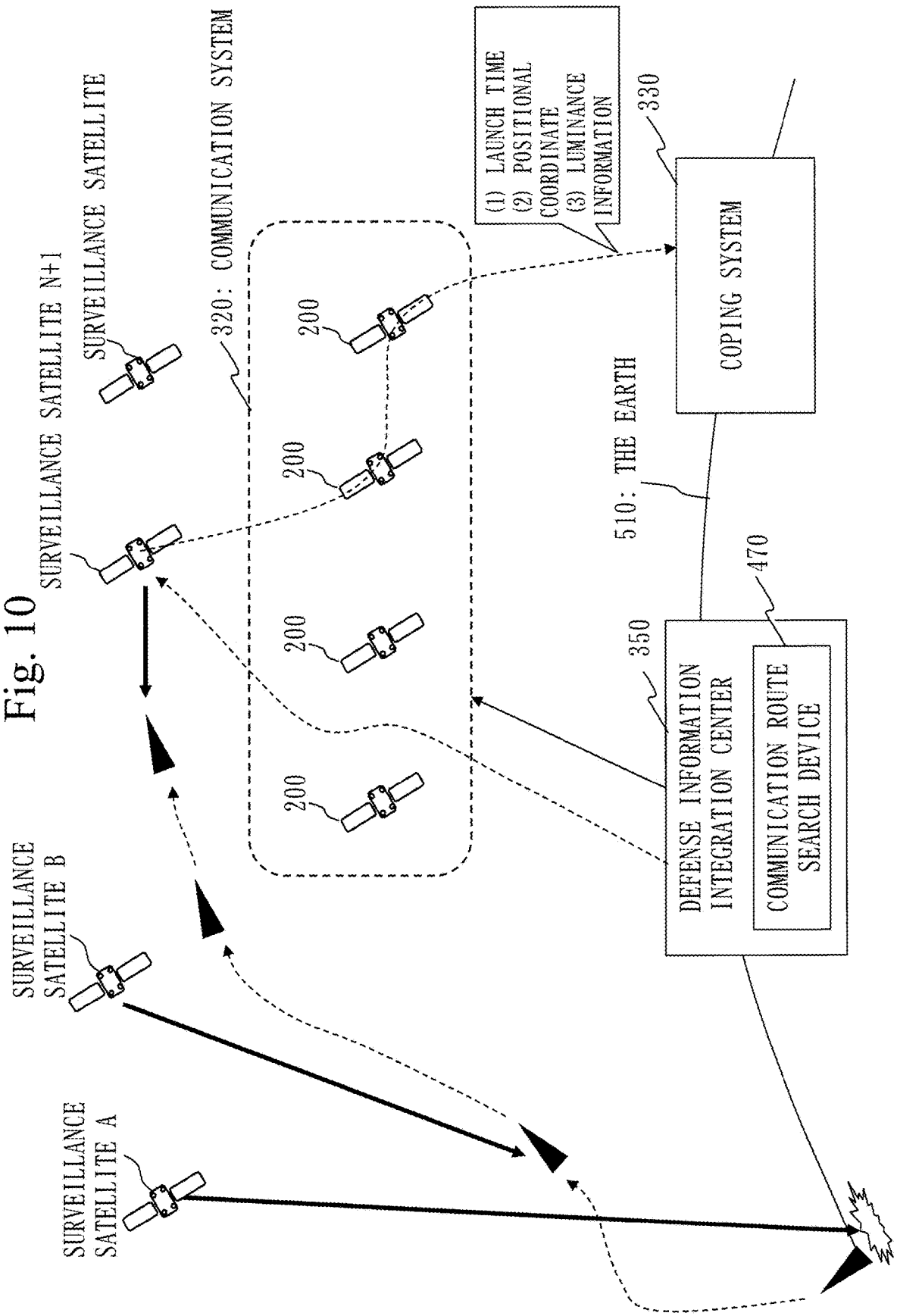
FIG. 10 is a diagram of Embodiment 1, illustrating transmission of flying object information measured by a surveillance satellite N+1 to the coping system 330.

FIG. 10 is a diagram illustrating transmission of flying object information measured by a surveillance satellite N+1 to the coping system 330 via the communication satellite 200. FIG. 10 is referred to.

The defense information integration center 350 transmits defense-center-side flying object information via the communication satellite of the communication system 320 to a surveillance satellite group flying in the vicinity of the surveillance satellite N. When the surveillance satellite N+1 detects a high-temperature object, the defense information integration center 350 searches for the shortest route in a communication network from a positional coordinate of the surveillance satellite N+1 to a positional coordinate of the coping asset 332, with the communication route search device 470 so as to transmit an information transmission instruction to the communication satellite group positioned on a communication path of the shortest route. Then, the defense information integration center 350 transmits
(1) detection time of the high-temperature object detected by the surveillance satellite N+1,
(2) a positional coordinate indicating a position of the surveillance satellite N+1 at the detection time, and
(3) luminance information based on the detection by the surveillance satellite N+1, as flying object information to the coping system 330 via the communication satellite 200 of the communication system 320.

Figure 11:
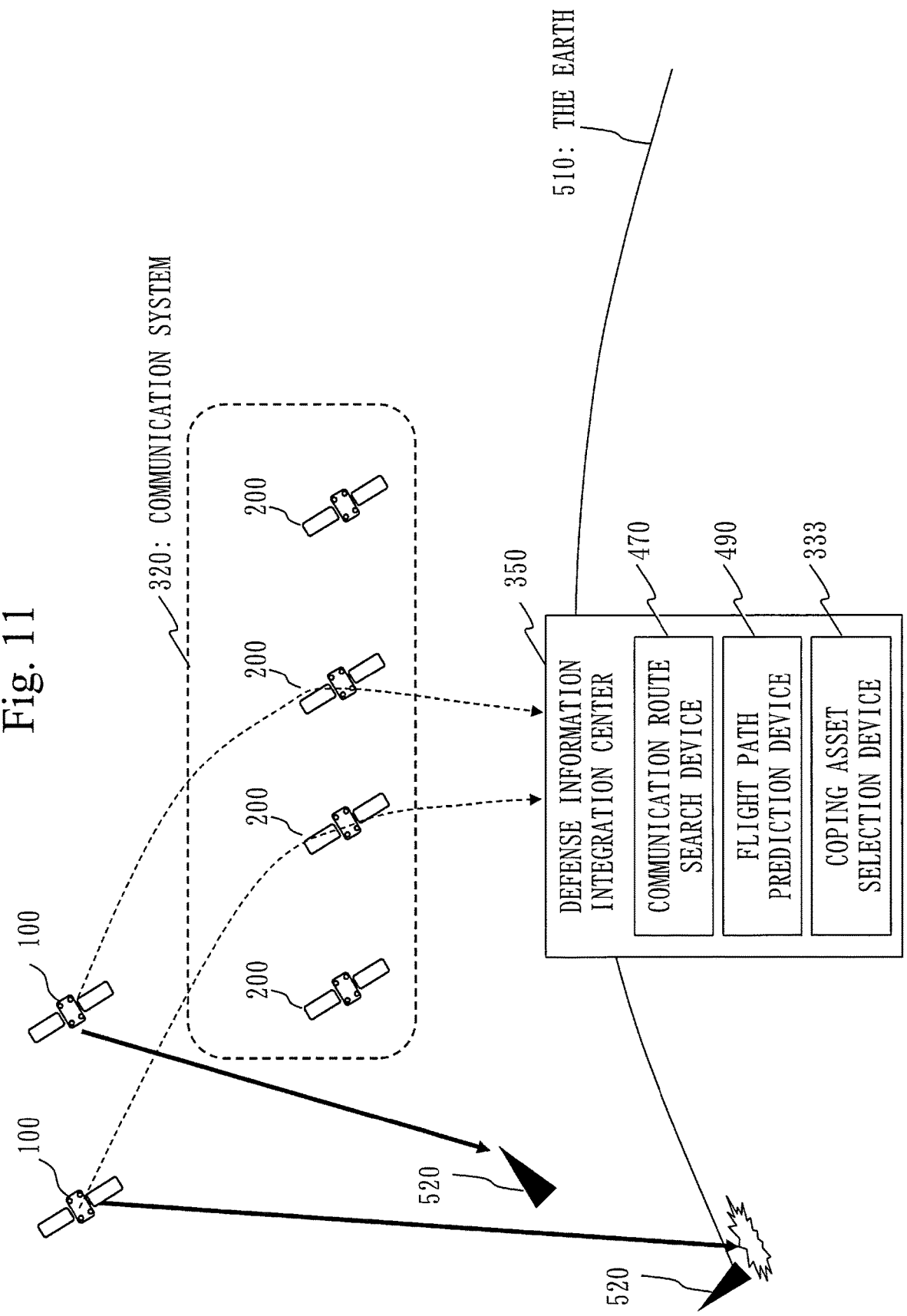
FIG. 11 is a diagram of Embodiment 1, illustrating a flight path prediction device 490.

FIG. 11 is a diagram illustrating the flight path prediction device 490. FIG. 11 is referred to. The flight path prediction device 490 generates flight path prediction information composed of future time and positional information, based on transition of time-series positional information of flying object information received from the surveillance satellite 100 via the communication satellite 200 of the communication system 320.

Figure 12:
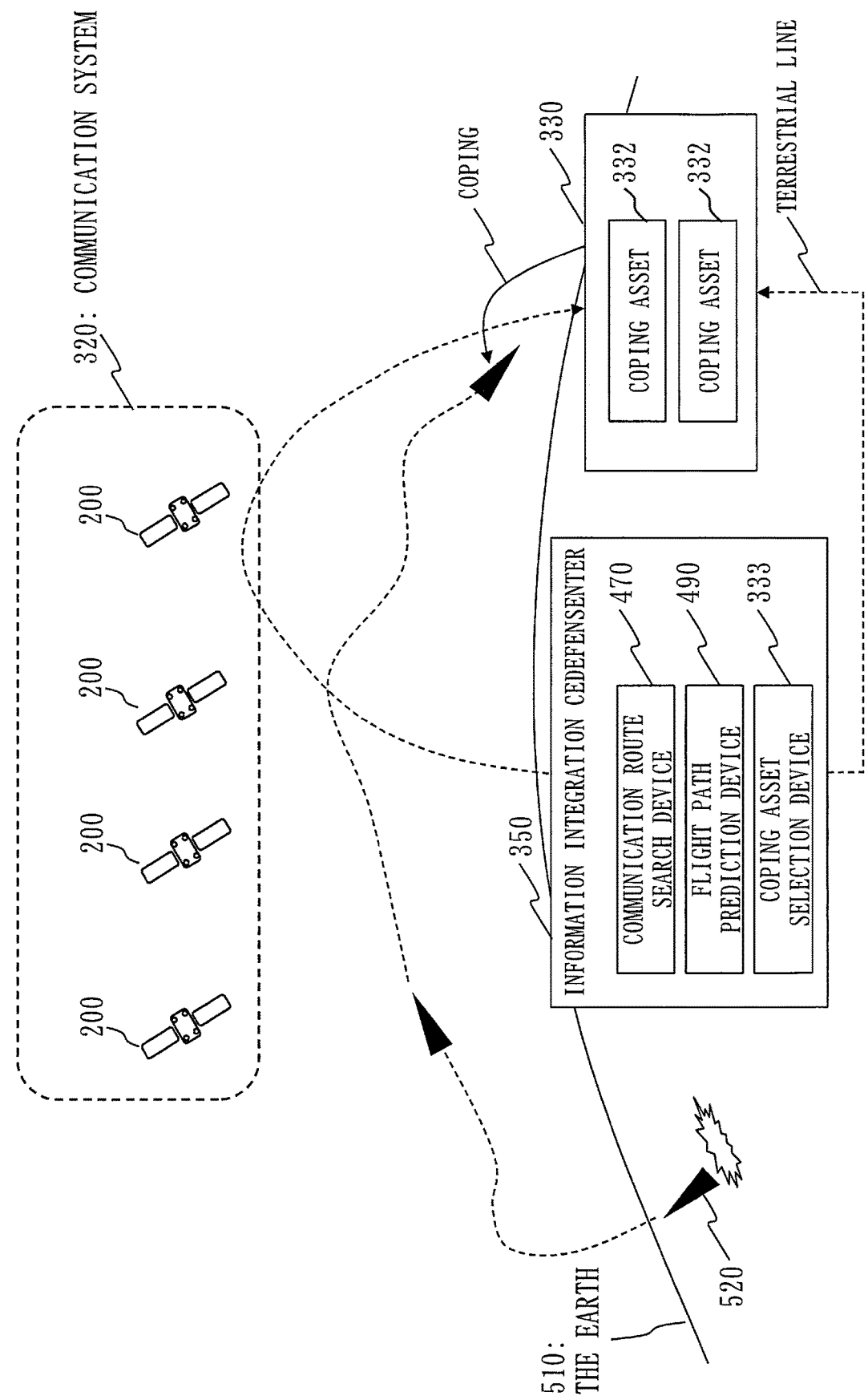
FIG. 12 is a diagram of Embodiment 1, illustrating a coping asset selection device 333.

FIG. 12 is a diagram illustrating the coping asset selection device 333. FIG. 12 is referred to. As illustrated in FIG. 12, the coping system 330 includes a plurality of coping assets 332. The coping asset selection device 333 selects a coping asset 332 which is in the vicinity of a positional coordinate that a flying object is predicted to pass through or reach based on flight path prediction information generated by the flight path prediction device 490, and transmits an instruction signal for coping action to the selected coping asset 332. The transmission path of the instruction signal from the coping asset selection device 333 to the coping asset 332 may be via the communication satellite 200 of the communication system 320 or may be a terrestrial line.

The flight path prediction device 490 included in the defense information integration center 350 may be configured to generate flight path prediction information including future time and positional information based on transition of time-series positional information of flying object information, and when any one surveillance satellite, which detects a high-temperature object, among the surveillance satellite B, the surveillance satellite C, the surveillance satellite N, and the surveillance satellite N+1 after the surveillance satellite A transmits launch detection information, to predict a moving direction of the flying object based on a positional coordinate of the surveillance satellite which has detected the high-temperature object so as to generate flight path prediction information.

FIG. 12 is referred to. The coping asset selection device 333 selects a coping asset 332 that is positioned in the vicinity of the flight path prediction information generated by the flight path prediction device 490, among a plurality of coping assets 332 on mutually-different positional coordinates. The defense information integration center 350 transmits flying object information and a coping action instruction to the coping asset 332.

Figure 13:
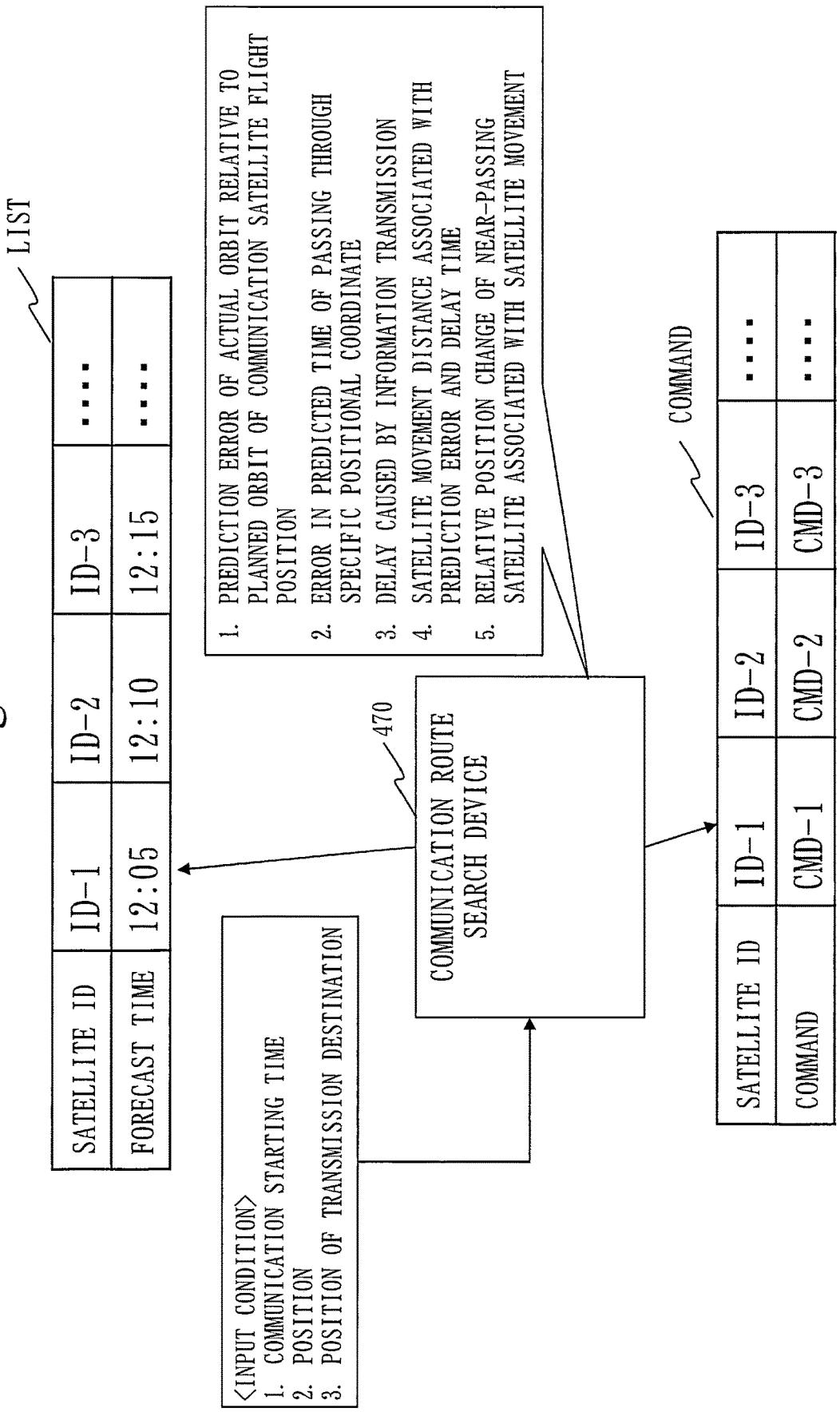
FIG. 13 is a diagram of Embodiment 1, illustrating a communication route search device 470 included in the defense information integration center 350.

FIG. 13 illustrates the communication route search device 470 included in the defense information integration center 350. FIG. 13 is referred to. The communication route search device 470 sets:
  (1) a communication starting time,
  (2) a positional coordinate, and
  (3) a positional coordinate of a transmission destination to which flying object information is to be transmitted, as input conditions.

The communication route search device 470 searches for an optimal route with beaded satellite IDs for transmitting flying object information, and produces, as products, a list and a command, the list that enumerates a series of satellite IDs and forecast time, at which a corresponding satellite is to transmit the flying object information to the following satellite, the command for giving a communication instruction to the corresponding communication satellite group.

The communication route search device 470 searches for an optimal route for transmitting the flying object information in the shortest possible time by putting:
  (1) a prediction error of an actual orbit relative to a planned orbit of a communication satellite flight position,
  (2) an error in predicted time of passing through a specific positional coordinate,
  (3) delay caused by information transmission,
  (4) a satellite movement distance associated with prediction error and delay time, and
  (5) a relative position change of a near-passing satellite associated with satellite movement, in route-search analysis objects.

Figure 14:
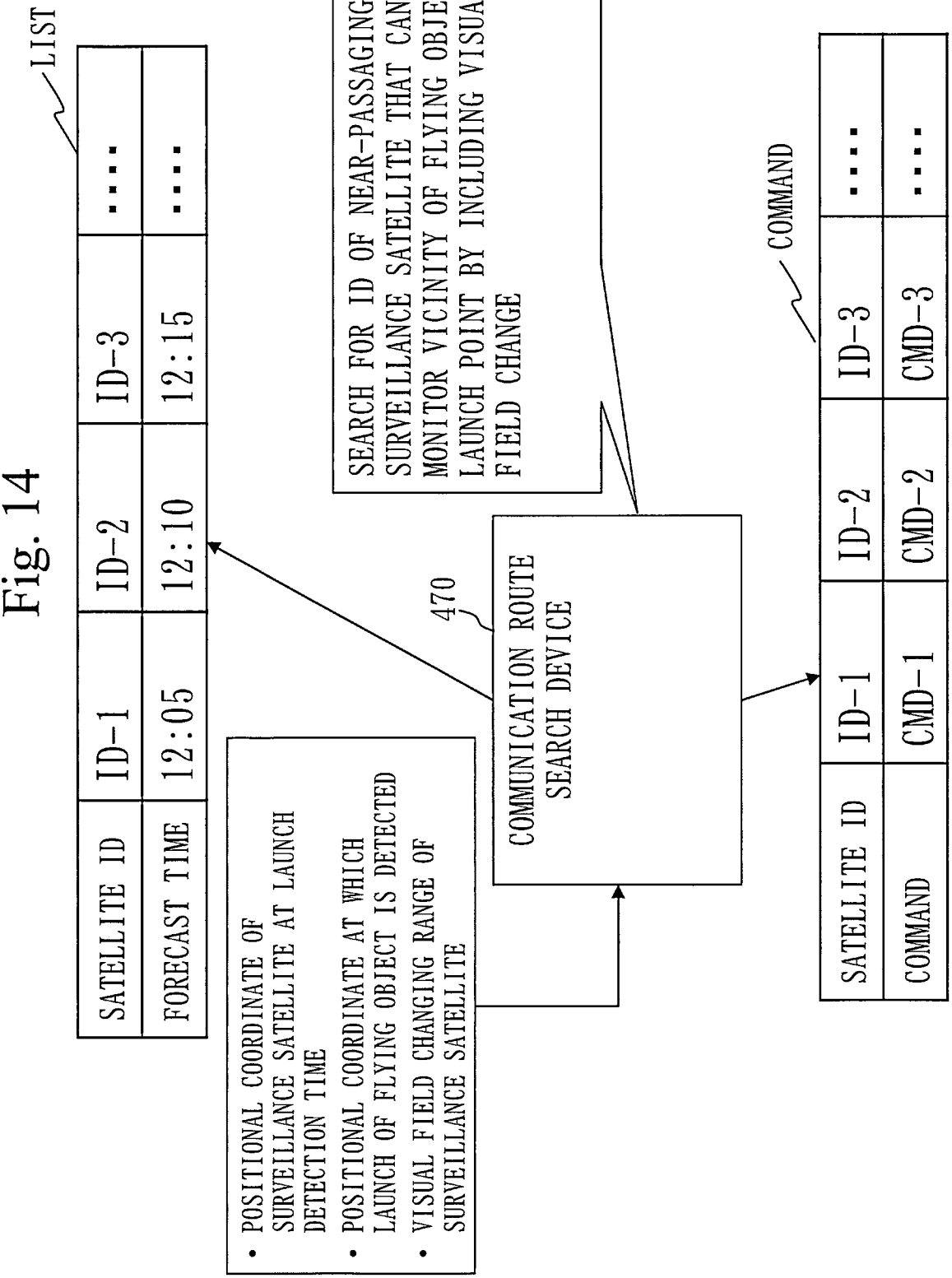
FIG. 14 is a diagram of Embodiment 1, illustrating the communication route search device 470 included in the defense information integration center 350.

FIG. 14 illustrates the communication route search device 470 included in the defense information integration center 350. FIG. 14 is referred to. The communication route search device 470 regards a launch detection signal of a surveillance satellite as a communication starting instruction, and sets:
  (1) a positional coordinate of a surveillance satellite that sends the launch detection signal,
  (2) a positional coordinate at which launch of a flying object is detected, and
  (3) a visual field changing range of the surveillance satellite, as input conditions.

The communication route search device 470 searches for an optimal route with beaded satellite IDs for transmitting flying object information, and produces, as products, a list and a command, the list that enumerates a series of satellite IDs and forecast time, at which a corresponding satellite is to transmit the flying object information to the following satellite, the command for giving a communication instruction to the corresponding communication satellite group.

The communication route search device 470 searches for an ID of a near-passing surveillance satellite that can monitor the vicinity of a flying object launch point by including a visual field change, and searches for flying object information transmission time, a surveillance satellite ID, and an optimal route for transmitting flying object information to the corresponding surveillance satellite ID.

FIG. 15 illustrates the communication route search device 470 included in the defense information integration center 350. FIG. 15 is referred to. The communication route search device 470 regards a launch detection signal of a surveillance satellite as a communication starting instruction, and sets:
  (1) a positional coordinate of the surveillance satellite that sends the launch detection signal,
  (2) a positional coordinate at which launch of a flying object is detected,
  (3) a visual field changing range of the surveillance satellite,
  (4) a positional coordinate of a surveillance satellite that sends a high-temperature detection signal among near-passing surveillance satellites that transmitted flying object information in the past, and
  (5) a positional coordinate at which a high-temperature object is detected, as input conditions.

The communication route search device 470 searches for an optimal route with beaded satellite IDs for transmitting flying object information, and produces, as products, a list and a command, the list that enumerates a series of satellite IDs and forecast time, at which a corresponding satellite is to transmit the flying object information to the following satellite, the command for giving a communication instruction to the corresponding communication satellite group. The communication route search device 470 searches for an ID of a near-passing surveillance satellite that can monitor the vicinity of a high-temperature object detection position by including a visual field change, and searches for flying object information transmission time, a surveillance satellite ID, and an optimal route for transmitting flying object information to the corresponding surveillance satellite ID.

Figure 16:
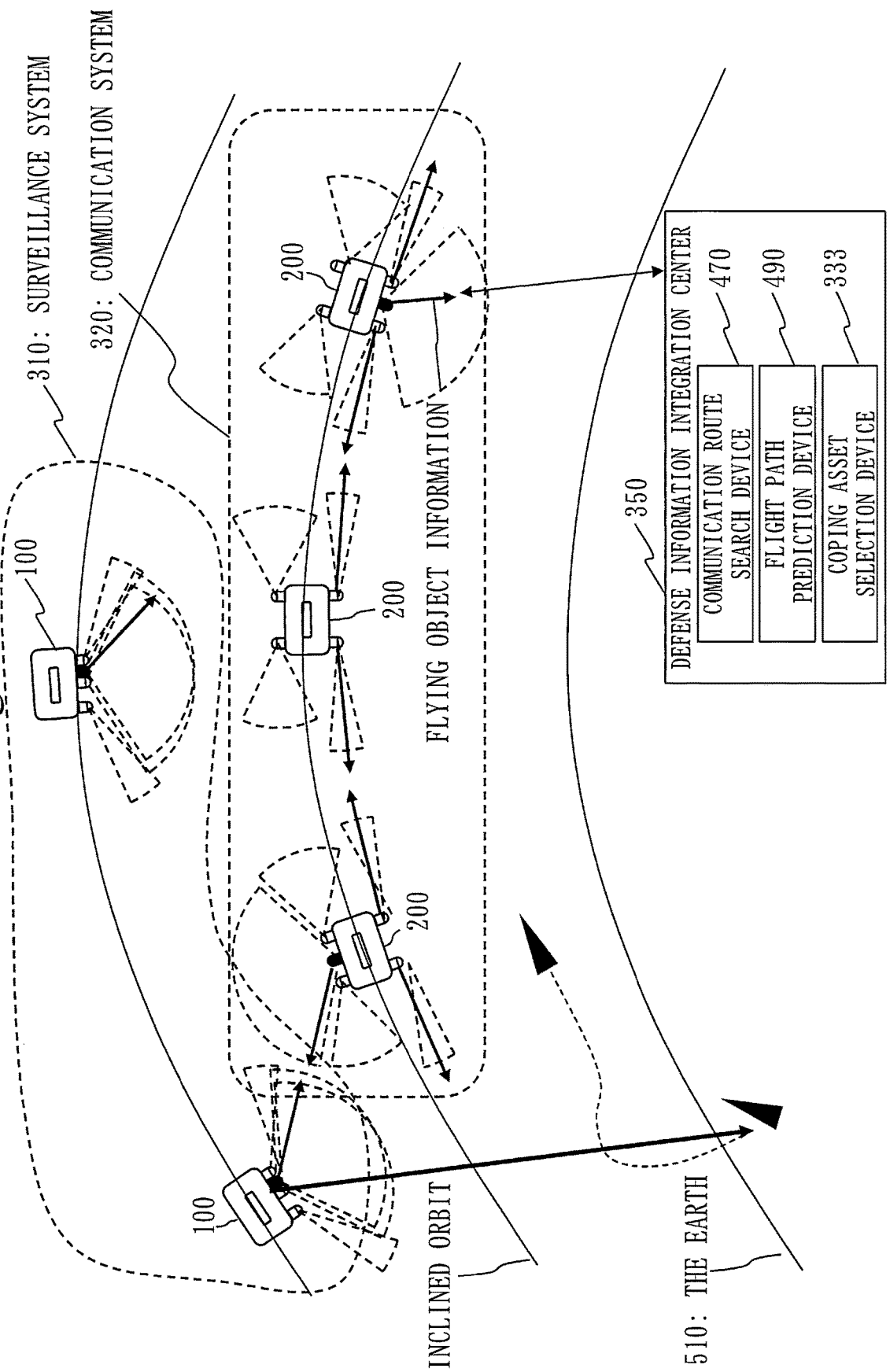
FIG. 16 is a diagram of Embodiment 1, illustrating processing of the flight path prediction device 490.

FIG. 16 illustrates processing of the flight path prediction device 490. FIG. 16 is referred to. When a plurality of surveillance satellites 100 equipped with a surveillance device in the surveillance system 310 detect a significant high-temperature object, the surveillance satellite 100 transmits detection time information, a surveillance satellite ID, a surveillance device ID, and surveillance data as flying object information to the defense information integration center 350 via the communication system 320. The flight path prediction device 490 included in the defense information integration center 350 derives positional information of the surveillance satellite of the corresponding ID at the detection time in the flying object information, a forwarding direction, and a line of sight of the surveillance satellite of the corresponding ID and extracts luminance of the high-temperature object from the surveillance data so as to derive a line-of-sight vector that points toward the high-temperature object.

Figure 17:
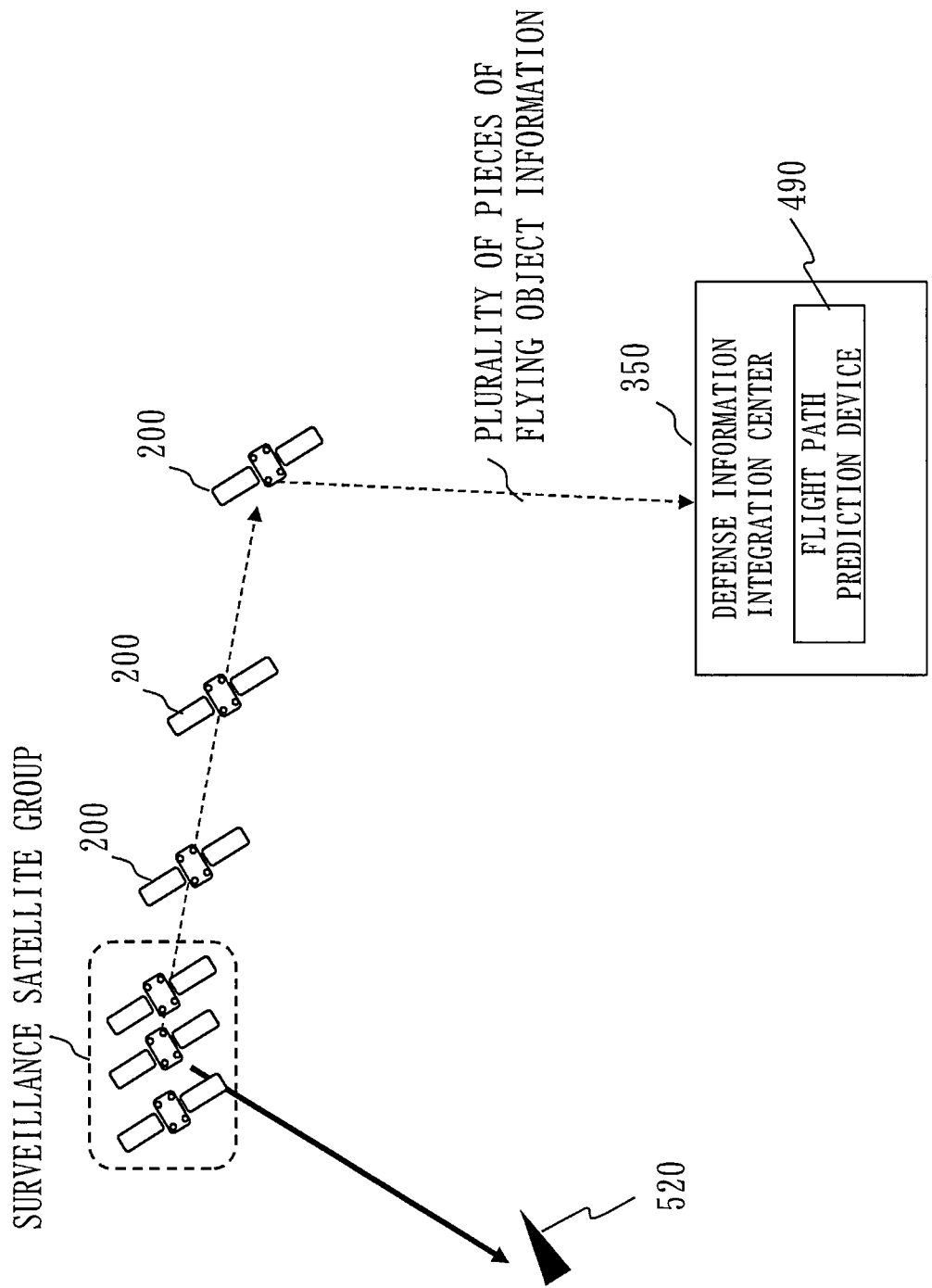
FIG. 17 is a diagram of Embodiment 1, illustrating processing of the flight path prediction device 490.

FIG. 17 illustrates processing of the flight path prediction device 490. FIG. 17 is referred to. The flight path prediction device 490 included in the defense information integration center 350 arranges line-of-sight vectors of a high-temperature object derived from flying object information of a plurality of surveillance satellites 100 in chronological order in the earth fixed coordinate system so as to predict a positional coordinate per time transition of the flying object based on principles of spatial triangulation.

Here, a configuration may be employed in which when a plurality of flying objects are launched at short intervals, it is determined that the flying objects are a plurality of different flying objects whose paths are predicted by the flight path prediction device by integrating pieces of flying object information acquired from a plurality of surveillance satellites.

The plurality of surveillance satellites 100 of the surveillance system 310 may employ an equatorial satellite system that is composed of a group of six or more equatorial surveillance satellites which fly in equatorial orbit with equal average orbital altitudes. The equatorial surveillance satellite group forms a communication cross-link with surveillance satellites flying in front and behind on the same orbital plane. At least one or more equatorial surveillance satellites form a communication cross-link with the coping system 330 or the defense information integration center 350 and transmit flying object information to the coping system 330 or the defense information integration center 350 without having the flying object information passing through the communication satellite 200 of the communication system 320.

The plurality of surveillance satellites 100 of the surveillance system 310 may employ a polar orbit satellite system that is composed of a group of six or more polar orbit surveillance satellites which fly in polar orbit with equal average orbital altitudes on the same orbital plane. The polar orbit surveillance satellite group forms a communication cross-link with polar orbit surveillance satellites flying in front and behind. At least one or more polar orbit surveillance satellites form a communication cross-link with the coping system 330 or the defense information integration center 350 and transmit flying object information to the coping system 330 or the defense information integration center 350 without having the flying object information passing through the communication satellite 200 of the communication system 320.

The surveillance satellite 100 of the surveillance system 310 may be configured to fly between a communication satellite 200 and a communication satellite 200 on an orbital plane, on which the communication satellites 200 of the communication system 320 fly, so as to form a communication cross-link with the front and rear communication satellites 200 and transmit flying object information to the coping system 330 or the defense information integration center 350 via the communication system 320.

Advantageous Effect of Embodiment 1

According to the flying object coping system 1000 of Embodiment 1, flying object information can be transmitted to the coping system 330 in quasi-real time by the cooperation of the surveillance system 310, the communication system 320, and the defense information integration center 350. Further, according to the flying object coping system 1000 of Embodiment 1, the defense information integration center 350 includes the communication route search device 470, the flight path prediction device 490, and the coping asset selection device 333, being able to quickly and accurately cope with flying objects.

REFERENCE SIGNS LIST

100: surveillance satellite; 200: communication satellite; 310: surveillance system; 320: communication system; 330: coping system; 332: coping asset; 333: coping asset selection device; 350: defense information integration center; 470: communication route search device; 490: flight path prediction device; 510: the earth; 520: flying object; 600: satellite constellation forming system; 610: satellite constellation; 620: satellite; 621: satellite control device; 622: communication device; 623: propulsion device; 624: attitude control device; 625: power supply device; 626: surveillance device; 700: ground facility; 910: processor; 911: satellite constellation forming unit; 921: memory; 922: auxiliary storage device; 930: input interface; 940: output interface; 950: communication device; 1000: flying object coping system

The invention claimed is:

1. A flying object coping system comprising:
a surveillance system including a plurality of surveillance satellites, the plurality of surveillance satellites including a surveillance device and a communication device;
a communication system including a plurality of communication satellites, the plurality of communication satellites including communication device; and
a coping system positioned on at least one of land, sea, and air and including a coping asset, the coping asset coping with a flying object, wherein
the surveillance system transmits flying object information, the flying object information being generated by monitoring the flying object, to the coping system via the communication system,
the flying object coping system includes a defense information integration center including a communication route search device for satellite information, a flight path prediction device to predict a flight path of a flying object, and a coping asset selection device,
the communication route search device
sets a communication starting time, a positional coordinate, and a positional coordinate of transmission destination to which flying object information is to be transmitted, as input conditions,
searches for an optimal route with beaded satellite IDs for transmitting flying object information, and produces, as products, a list and a command, the list that enumerates a series of satellite IDs and forecast time at which a corresponding satellite is to transmit flying object information to a following satellite, the command for giving a communication instruction to a corresponding communication satellite group, and
searches for an optimal route for transmitting flying object information in a shortest possible time, and
the defense information integration center transmits an instruction command to a surveillance satellite group included in the surveillance system, a communication satellite group included in the communication system, and the coping asset.

2. The flying object coping system according to claim 1, wherein
one or more surveillance satellites of the plurality of surveillance satellites include an infrared surveillance device, and
the surveillance satellite including the infrared surveillance device makes the infrared surveillance device detect a plume in launch of the flying object and the flying object flying at elevated temperature, as high-temperature objects, and transmits information, the information including detection time at which the infrared surveillance device detects the high-temperature objects and at least either one positional information of positional information indicating a position of the surveillance satellite including the infrared surveillance device and positional information indicating a position of the flying object, as the flying object information.

3. The flying object coping system according to claim 1, wherein
communication satellites included in the communication system make a cross-link by the communication devices thereof so as to form a communication network, and
the defense information integration center searches for a shortest route of a communication path for information transmission with the communication route search device and transmits an information transmission instruction to the communication satellites constituting the communication path being searched for.

4. The flying object coping system according to claim 1, wherein
after a surveillance satellite A included in the surveillance system detects launch of the flying object,
the defense information integration center transmits information including
launch detection time at which launch of the flying object is detected, and
a positional coordinate indicating a position of at least either one of the flying object and the surveillance satellite A,
as flying object information to the coping system.

5. The flying object coping system according to claim 1, wherein
the defense information integration center searches for a shortest route in a communication network using the communication route search device, the communication network being formed by the communication satellite group from a positional coordinate from which the surveillance satellite A emits flying object information to a positional coordinate of the coping system so as to transmit an information transmission instruction to the communication satellite group positioned on a communication path of the shortest route, and transmits information, the information including launch detection time of the flying object and at least either one positional information of positional information indicating a position of the surveillance satellite A and positional information indicating a position of a launch point of the flying object, as flying object information to the coping system.

6. The flying object coping system according to claim 1, wherein
the defense information integration center transmits defense-center-side flying object information via the communication system to the surveillance satellite group flying around the surveillance satellite A after launch of the flying object, and
the defense information integration center
searches for a shortest route in a communication network, the communication network being formed by the communication satellite group from a position indicated by positional information of a surveillance satellite B to a position of the coping system with the communication route search device so as to transmit an information transmission instruction to a communication satellite group positioned on a communication path of the shortest route, and transmits
detection time of a high-temperature object,
a positional coordinate indicating a position of the surveillance satellite B at the detection time, and
luminance information based on detection by the surveillance satellite B,
as flying object information to the coping system.

7. The flying object coping system according to claim 6, wherein
the defense information integration center transmits defense-center-side flying object information via the communication system to a surveillance satellite group flying in a vicinity of the surveillance satellite B, and
when a surveillance satellite C detects a high-temperature object, the defense information integration center
searches for a shortest route in a communication network from a positional coordinate of the surveillance satellite C to a positional coordinate of the coping system with the communication route search device so as to transmit an information transmission instruction to a communication satellite group positioned on a communication path of the shortest route, and transmits
detection time of the high-temperature object detected by the surveillance satellite C,
a positional coordinate indicating a position of the surveillance satellite C at the detection time, and
luminance information based on detection by the surveillance satellite C,
as flying object information to the coping system.

8. The flying object coping system according to claim 7, wherein
the defense information integration center transmits defense-center-side flying object information via the communication satellites of the communication system to a surveillance satellite group flying in a vicinity of a surveillance satellite N, and
when a surveillance satellite N+1 detects a high-temperature object, the defense information integration center
searches for a shortest route in a communication network from a positional coordinate of the surveillance satellite N+1 to a positional coordinate of the coping system with the communication route search device so as to transmit an information transmission instruction to a communication satellite group positioned on a communication path of the shortest route, and transmits
detection time of the high-temperature object detected by the surveillance satellite N+1,
a positional coordinate indicating a position of the surveillance satellite N+1 at the detection time, and
luminance information based on detection by the surveillance satellite N+1,
as flying object information to the coping system.

9. The flying object coping system according to claim 1, wherein
the flight path prediction device generates flight path prediction information including future time and positional information, based on transition of time-series positional information of flying object information received from the surveillance system.

10. The flying object coping system according to claim 9, wherein
the coping asset selection device selects a coping asset that is to cope with a flying object, based on the flight path prediction information generated by the flight path prediction device and transmits an instruction signal for instructing a coping action to the coping asset being selected.

11. The flying object coping system according to claim 8, wherein
the flight path prediction device generates flight path prediction information including future time and positional information based on transition of time-series positional information of flying object information, and when any one surveillance satellite among the surveillance satellite B, the surveillance satellite C, the surveillance satellite N, and the surveillance satellite N+1 detects the high-temperature object after the surveillance satellite A transmits launch detection information, the flight path prediction device predicts a moving direction of a flying object based on a positional coordinate of the surveillance satellite which detects the high-temperature object, so as to generate flight path prediction information.

12. The flying object coping system according to claim 10, wherein
the coping system includes a plurality of coping assets,
positional coordinates of the plurality of coping assets are different from each other,
the coping asset selection device selects a coping asset, the coping asset being positioned in a vicinity of flight path prediction information generated by the flight path prediction device, from the plurality of coping assets, and
the defense information integration center transmits defense-center-side flying object information and a coping action instruction to the coping asset being selected.

13. The defense information integration center included in the flying object coping system according to claim 1.

14. The communication route search device included in the flying object coping system according to claim 1, wherein
the communication route search device
searches for an optimal route for transmitting flying object information in a shortest possible time by putting
a prediction error of an actual orbit relative to a planned orbit of a communication satellite flight position,
an error in predicted time of passing through a specific positional coordinate,
delay caused by information transmission,
a satellite movement distance associated with prediction error and delay time, and
a relative position change of a near-passing satellite associated with satellite movement,
in route-search analysis objects.

15. The communication route search device included in the flying object coping system according to claim 6, wherein
the communication route search device
regards a launch detection signal of a surveillance satellite as a communication starting instruction,
sets a positional coordinate of the surveillance satellite that sends the launch detection signal, a positional coordinate at which launch of a flying object is detected, and a visual field changing range of the surveillance satellite, as input conditions,
searches for an optimal route with beaded satellite IDs for transmitting flying object information, and produces, as products, a list and a command, the list that enumerates a series of satellite IDs and forecast time at which a corresponding satellite is to transmit flying object information to a following satellite, the command for giving a communication instruction to a corresponding communication satellite group, and
searches for an ID of a near-passing surveillance satellite that can monitor a vicinity of a flying object launch point by including a visual field change, and searches for flying object information transmission time, a surveillance satellite ID, and an optimal route for transmitting flying object information to a corresponding surveillance satellite ID.

16. The communication route search device included in the flying object coping system according to claim 7, wherein
the communication route search device
regards a launch detection signal of a surveillance satellite as a communication starting instruction,
sets a positional coordinate of the surveillance satellite that sends the launch detection signal, a positional coordinate at which launch of a flying object is detected, a visual field changing range of the surveillance satellite, a positional coordinate of a surveillance satellite that sends a high-temperature detection signal among near-passing surveillance satellites that transmitted flying object information in the past, a positional coordinate at which a high-temperature object is detected, and a visual field changing range of the surveillance satellite, as input conditions,
searches for an optimal route with beaded satellite IDs for transmitting flying object information, and produces, as products, a list and a command, the list that enumerates a series of satellite IDs and forecast time at which a corresponding satellite is to transmit flying object information to a following satellite, the command for giving a communication instruction to a corresponding communication satellite group, and
searches for an ID of a near-passing surveillance satellite that can monitor a vicinity of a high-temperature object detection position by including a visual field change, and searches for flying object information transmission time, a surveillance satellite ID, and an optimal route for transmitting flying object information to a corresponding surveillance satellite ID.

17. The flying object coping system according to claim 1, wherein
when a plurality of surveillance satellites equipped with a surveillance device detect a significant high-temperature object,
the surveillance satellite transmits detection time information, a surveillance satellite ID, a surveillance device ID, and surveillance data as flying object information to the defense information integration center via the communication system, and
the flight path prediction device included in the defense information integration center
derives positional information of a surveillance satellite of a corresponding ID at detection time in the flying object information, a forwarding direction, and a line of sight of the surveillance satellite of the corresponding ID, and
extracts luminance of the high-temperature object from the surveillance data so as to derive a line-of-sight vector that points toward the high-temperature object.

18. The flying object coping system according to claim 17, wherein
the flight path prediction device arranges line-of-sight vectors of a high-temperature object, the line-of-sight vectors being derived from flying object information of a plurality of surveillance satellites, in chronological order in an earth fixed coordinate system so as to predict a positional coordinate per time transition of the flying object based on principles of spatial triangulation.

19. The flight path prediction device included in the flying object coping system according to claim 9.

20. The flying object coping system according to claim 1, wherein
the surveillance system includes a group of six or more equatorial surveillance satellites that fly in an equatorial orbit with equal average orbital altitudes,
the group of equatorial surveillance satellites forms a communication cross-link with surveillance satellites flying in front and behind on a same orbital plane, and
at least one or more equatorial surveillance satellites form a communication cross-link with the coping system or the defense information integration center and transmit flying object information to the coping system or the defense information integration center without having the flying object information passing through the communication system.

21. The flying object coping system according to claim 1, wherein
the surveillance system includes a group of six or more polar orbit surveillance satellites that fly in polar orbit with equal average orbital altitudes on a same orbital plane,
the group of polar orbit surveillance satellites forms a communication cross-link with polar orbit surveillance satellites flying in front and behind, and
at least one or more polar orbit surveillance satellites form a communication cross-link with the coping system or the defense information integration center and transmit flying object information to the coping system or the defense information integration center without having the flying object information passing through the communication system.

22. The flying object coping system according to claim 1, wherein
the surveillance satellite of the surveillance system flies between a communication satellite and a communication satellite on an orbital plane, on which communication satellites of the communication system fly, so as to form a communication cross-link with front and rear communication satellites and transmit flying object surveillance information to the coping system or the defense information integration center via the communication system.

23. A flying object coping system comprising:
a surveillance system including a plurality of surveillance satellites, the plurality of surveillance satellites including a surveillance device and a communication device;
a communication system including a plurality of communication satellites, the plurality of communication satellites including respective communication devices; and
a coping system positioned on at least one of land, sea, and air and including a coping asset, the coping asset coping with a flying object, wherein
the surveillance system transmits flying object information, the flying object information being generated by monitoring the flying object, to the coping system via the communication system,
the flying object coping system includes a defense information integration center including a communication route search device for satellite information, a flight path prediction device to predict a flight path of a flying object, and a coping asset selection device,
the defense information integration center transmits an instruction command to a surveillance satellite group included in the surveillance system, a communication satellite group included in the communication system, and the coping asset, and
the surveillance satellite of the surveillance system flies between a communication satellite and a communication satellite on an orbital plane, on which communication satellites of the communication system fly, so as to form a communication cross-link with front and rear communication satellites and transmit flying object surveillance information to the coping system or the defense information integration center via the communication system.

* * * * *